United States Patent

[11] 3,557,847

[72] Inventors Carl G. Hebel
 390 Jefferson Ave., Haworth, N.J. 07641;
 Robert F. Bardsley, 24 Council Place,
 Harrington Park, N.J. 07640
[21] Appl. No. 672,534
[22] Filed Oct. 3, 1967
[45] Patented Jan. 26, 1971

[54] DISPENSING APPARATUS FOR PARTICULATE MATTER
 13 Claims, 7 Drawing Figs.
[52] U.S. Cl. .................................................... 141/54,
 141/128; 177/103, /108; 222/77
[51] Int. Cl. .......................................................... B65b 31/00
[50] Field of Search ............................................ 222/77; -
 141/(Inquired), 59, 128, 54; 177/53, 103, 108, 59,
 (Inquired)

[56] References Cited
UNITED STATES PATENTS
2,777,661   1/1957   Merrill et al. ..................   177/108

*Primary Examiner*—Houston S. Bell, Jr.
*Attorney*—Le Fever, Wuillinan and Hubbard ABSTRACT: A dispensing apparatus has been designed which is suitable for handling friable, particulate matter and is adaptable for use on relatively high-speed packing lines. The apparatus consists essentially of a weigh bucket and a product supply unit. Flow of product into the weigh bucket from the supply unit is controlled by a bulk and dribble gate which is moved vertically within the supply unit permitting first a rapid or bulk flow and then a slow or dribble flow of product. The weigh bucket moves together with a plunger valve, vertically down while it is being filled. After the predetermined weight of product has been received, the plunger valve moves vertically independently of the bucket allowing product to discharge from the weigh bucket. The apparatus is compact and has less moving parts than most net weighing devices.

PATENTED JAN 26 1971 3,557,847

INVENTORS.
CARL G. HEBEL
ROBERT F. BARDSLEY

BY LeFevre, Guillman
& Hubbard

DISPENSING APPARATUS FOR PARTICULATE MATTER

BACKGROUND OF THE INVENTION

This invention relates to packaging friable, particulate matter by weighing the desired quantity of material to be packaged. An apparatus has been developed to control the flow of particulate matter into a weigh bucket and a weigh bucket and plunger valve have been developed which move together in a vertical direction while the bucket is being filled. The plunger valve then moves independently of the bucket to allow the weighed quantity of particulate matter to flow out of the weigh bucket.

A wide variety of packing lines have been developed to handle a large assortment of products. In all of the different packing lines in use, there is some means of metering a desired quantity of product into a receptacle or container. Two broad classes which can be used to describe the metering devices are volumetric fillers and net weighers. A net weigher generally dispenses a predetermined weight of product, while a volumetric filler dispenses a predetermined volume of product.

Many packages which are marketed according to net weight are actually packaged with a volumetric filler, the container being designed to receive a volume corresponding to a desired weight. This type of an arrangement is limited in weight control accuracy, but is commonly used for want of a satisfactory, high speed net weigher.

Net weighers commonly used in industry have mechanical feeders such as vibrating conveyors, screw conveyors or belt conveyors to feed the product into a weighing device. The aforementioned feeders are used to control the rate of product flow into a weigh bucket and to stop the flow when a desired weight is achieved. These feeder devices are cumbersome, the mechanisms for driving them are subject to wear and to breakdown, and it is difficult to shroud them properly in order to prevent objectionable dusting in the packaging equipment and the packing area.

The weigh buckets commonly used today, after receiving a desired weight of product, discharge the product through hinged gates which swing open or pivot to an inclined position which permits the product to flow out. The gates and hinges are subject to fouling by a buildup of dust, and the openings or protrusions formed when the gates open tend to trap product which can obstruct the free movement of the gates as well as product discharging form the bucket. The trapped product and dust are subject to unusual holdup and can deteriorate, subsequently contaminating the product being packaged.

The opening of gates or pivoting of the bucket are mechanisms not easily confined to a space suitable for use in a multihead packaging unit. It is also difficult to construct a dust free packaging unit with the aforementioned mechanisms.

SUMMARY OF THE INVENTION

It has now been discovered that an improved net weighing device for particulate matter can be made from a weigh bucket with an opening in the bottom for discharging product and a plunger valve which seats against the bottom of the bucket to seal the opening. The bucket and plunger valve are mounted vertically and move down together as the bucket is being filled. The downward motion of the bucket ceases when the desired weight of product has been received and the bucket seats against a surface which is part of a transfer head for containing and guiding the flow of product on discharge. The plunger valve moves vertically away from the bucket, permitting the product to flow out of the bucket, and the bucket and plunger valve are returned to a starting position to receive additional product. The flow of product into the weigh bucket is controlled by a supply unit mounted vertically over the weigh bucket. The supply unit comprises a cylindrical chamber and a bulk and dribble gate which moves vertically within the chamber. Flow of particulate matter is controlled by the shape of the chamber walls, the shape of the bulk and dribble gate, and by the position of the gate within the chamber. In a lowered position the gate seats against the bottom of the chamber and stops the flow of product out of a bottom opening. In a raised position the gate and the walls of the chamber form channels which permit an initial rapid or bulk flow of product into the weigh bucket and which subsequently restrict the flow of product to a slow or dribble flow.

It is an object of this invention to build a compact net weighing device for particulate matter which can be used on a relatively high-speed packing line.

A further object of this invention is to build a device for controlling the flow of particulate matter into a weigh bucket which is compact and simple, containing a minimum of moving parts which are subject to fouling and breakdown.

Another object of this invention is to build a weigh bucket that is streamline in design with a plunger valve that is not subject to fouling by product dust.

It is still another object of this invention to design a net weighing device which is easily shrouded, and whose components form tight seals, thus preventing a serious dust problem in the packing area.

The manner in which these and other objects are accomplished with the present invention will be apparent from the accompanying drawings and description of the preferred embodiment.

DETAILED DESCRIPTION OF THE DRAWINGS AND PREFERRED EMBODIMENT

Figure 1:
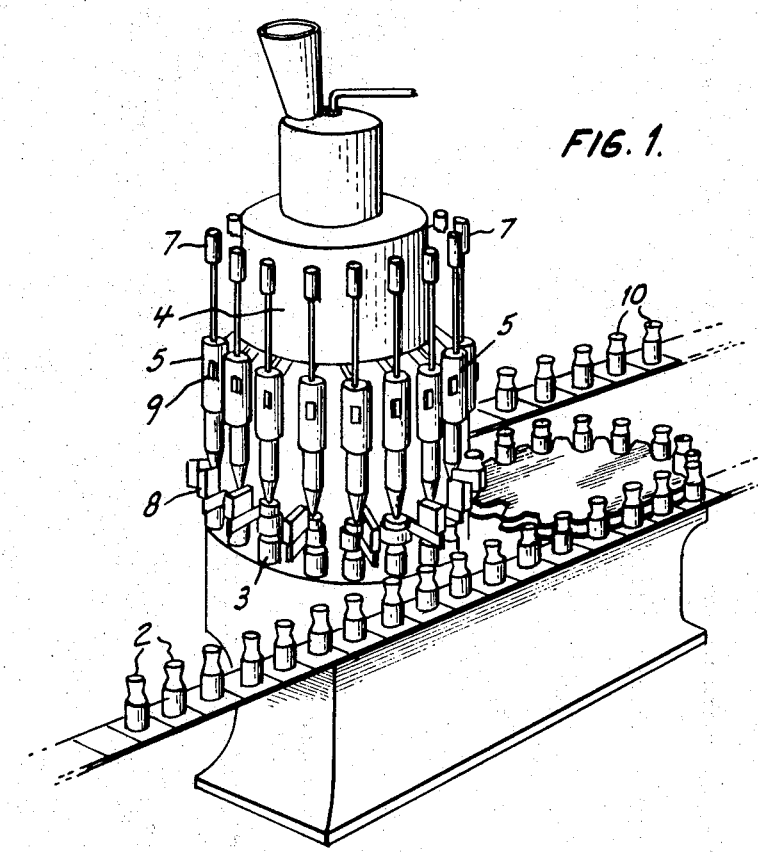
FIG. 1 is a pictorial view of a continuous packing line using the net weigher of this invention.

FIG. 1 is a pictorial view of a packing line with a continuous filling machine 1. Empty jars 2 are fed into position beneath the transfer heads 3. Product from the feed hopper 4 flows into the product supply units 5. The flow of product from the supply unit 5 into the weigh bucket 6 is controlled by positioning a bulk and dribble gate within the supply unit with an air cylinder 7. Flow into the bucket is stopped when the sensing device 8 indicates the predetermined weight of product is in the weigh bucket. The vibrators 9 help to keep the product flowing while product is discharging from the supply units. Product is discharged from the weigh buckets 6, through the transfer heads 3 into the jars. The filled jars 10 are then conveyed away from the filling machine. The supply units, weigh buckets and jars rotate around the feed hopper while the jars are being filled.

Figure 2:
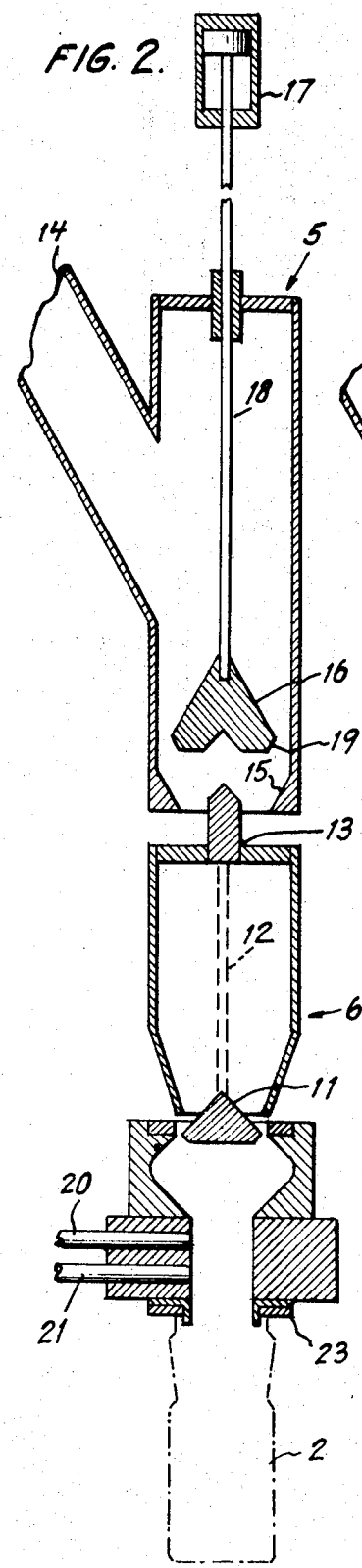
FIG. 2 is a longitudinal, cross-sectional, schematic view of a product supply unit, a weigh bucket, a transfer head and a jar in place under the transfer head, with the bucket being filled rapidly.

FIG. 2 is a longitudinal cross section of a supply unit 5 and weigh bucket 6 with a jar 2 in position below the transfer head 3. The weigh bucket 6 and plunger valve 11 are in a raised position. The weigh bucket is empty and ready to receive product from the supply unit 5. The plunger valve sealing the opening at the bottom of the weigh bucket is held in this position by a spring 12 attached at the lower end to the plunger valve and at the upper end to a support bar called a gate rest 13. The gate rest is attached to the upper portion of the weigh bucket. Mounted vertically above the weigh bucket is the supply unit 5, a cylindrically shaped unit which receives product from the feed hopper through an opening 14 near the top of the unit. At the bottom of the supply unit the wall of the cylinder slants in toward the center in the shape of funnel 15. Mounted internally in the supply unit is a bulk and dribble gate 16 used to control the flow of product from the supply unit to the weigh bucket. The bulk and dribble gate is connected to a three position air cylinder 17 by a rod 18 which rises vertically and passes through the upper wall of the supply unit. The bulk and dribble gate is constructed as a cone and is mounted with the base of the cone down. The bottom edge 19 of the cone rests against the wall of the supply unit when the gate is in its lowest position. In FIG. 2 the bulk and dribble gate is shown in its fully raised position, so that a relatively large opening is formed between the gate and the wall of the supply unit permitting rapid (bulk) flow of product into the weigh bucket. A vacuum line 20 and gas line 21 are shown in the transfer head 3. Valves in these lines (not shown) are closed while the weigh bucket is being filled. The jar is held in place against a gasket 23 sealing the bottom opening in the transfer head.

Figure 3:
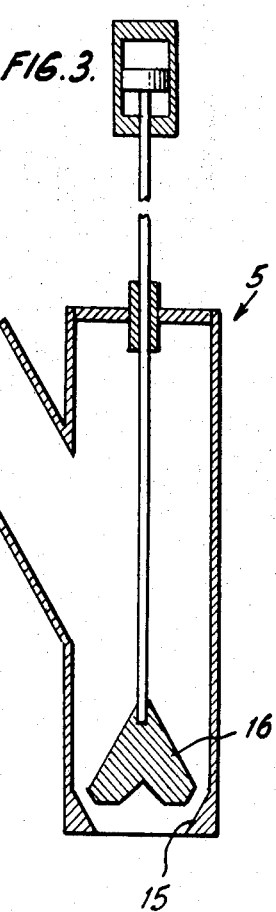
FIG. 3 is a longitudinal, cross-sectional, schematic view of the product supply unit with the bulk and dribble gate restricting flow into the weigh bucket.

FIG. 3 is a longitudinal cross section of the product supply unit 5 of FIG. 2 with the bulk and dribble gate 16 in its intermediate position (between fully raised and fully lowered) such that flow of product from the supply unit is restricted to a slow (dribble) flow by the reduced opening formed between the bulk and dribble gate and the funnel shaped portion 15 of the supply unit. The bulk and dribble gate is moved from the fully raised position to the intermediate position upon a signal from the weight sensing device (not shown).

Figure 4:
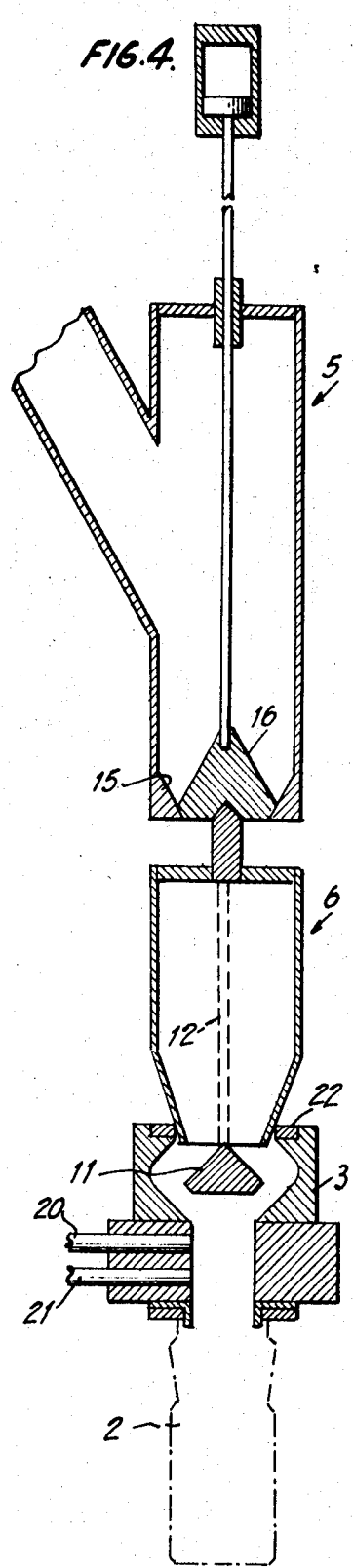
FIG. 4 is the same view as FIG. 2 with flow into the bucket stopped and product being discharged into the jar.

FIG. 4 is the same cross-sectional view shown in FIG. 2 with the bulk and dribble gate 16 in its fully lowered position such that the gate rests against the funnel portion 15 of the supply unit 5 preventing additional flow into the weigh bucket 6. The weigh bucket is in its lowered position and is seated against a gasket 22 on the upper surface of the transfer head 3. The plunger valve 11 has moved vertically down into the transfer head permitting product to flow from the weigh bucket into the jar 2. The plunger valve is moved by a pressure difference which overcomes the spring 12 tension, when a vacuum is pulled in the transfer head and jar through the vacuum line 20. Vacuum is broken by introducing gas into the transfer head through the gas line 21 and the spring tension reseats the plunger valve against the bottom of the weigh bucket.

Figure 5:
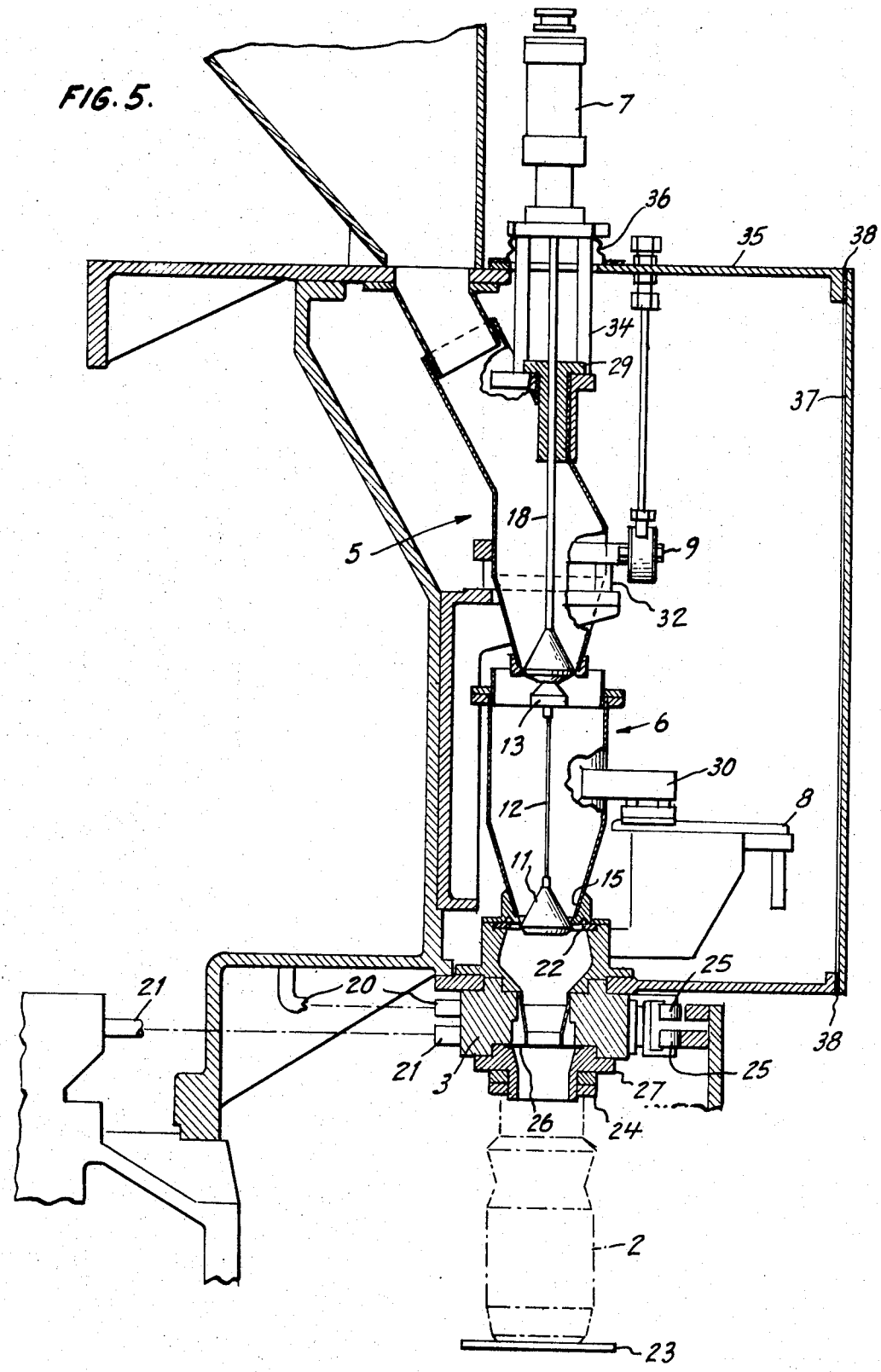
FIG. 5 is a longitudinal, cross-sectional view of a product supply unit, a weigh bucket, a transfer head and jar showing some of the structural details.

FIG. 5 is a longitudinal cross section showing the weigh bucket 6, and product supply unit 5 of FIG. 2 with some of the structural details included. Starting at the bottom, a jar lift plate 23 is shown holding an empty jar 2 against a gasket 24 at the bottom of the transfer head 3. The vacuum line 20 and gas line 21 are shown entering the transfer head. Cam followers 25 which control the movement of valves within the gas and vacuum lines are mounted on the transfer head. A screen 26 is shown at the bottom of the transfer head above the jar adapter 27. Jar adapter is changed to accommodate a particular size jar. In its lower position the weigh bucket 6 seats against a gasket 22 at the top of the transfer head. The plunger valve 11 is seated against the weigh bucket and is held in position by the spring 12 which is in turn attached to the gate rest 13 at the top of the weigh bucket. A mounting bracket is shown supporting an ATC weigh cell 8 with the weigh bucket mount 30 pressing against the weigh cell. The plunger valve 11 is seated against the funnel shaped portion 15 of the product supply unit 5 and is also resting against the gate rest 13. The product supply unit is resting on a mounting bracket. A vibrator 9 is shown attached to the product supply unit with shock absorbers 32 between the vibrator and the mounting bracket. The rod 18 connecting the bulk and dribble gate to the air cylinder 7 is shown passing through a guide sleeve 29 at the top of the supply unit, with a dust wiper sealing the opening in the guide sleeve. The cylinder support 34 is sealed to the top plate 35 by a rubber boot 36. The total system is enclosed and can be serviced through an access plate 37 held in place against a gasket 38.

Figure 6:
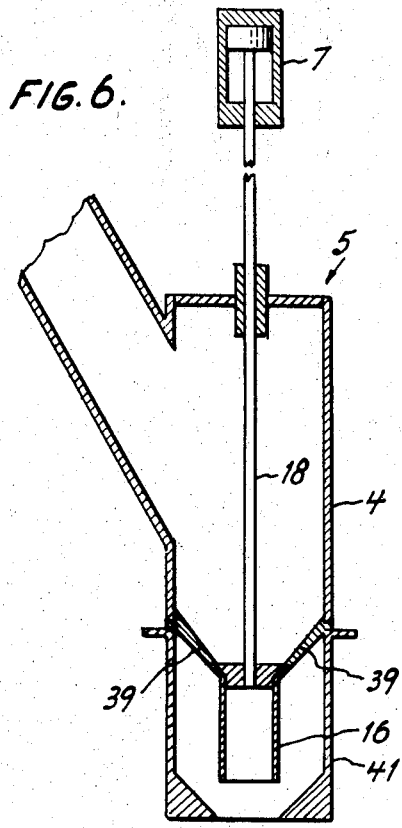
FIG. 6 is a longitudinal cross section of a product supply unit showing an alternative construction for control of bulk and dribble flow of product.

FIG. 6 is a longitudinal cross section of a product supply unit 5 showing an alternative internal arrangement for control of bulk and dribble flow rates. The bulk and dribble gate 16 is in the shape of a short cylinder or tube. There is a cone shaped partition 39 affixed to the inner wall of the supply unit partitioning the unit into an upper 4 and lower 41 section. The gate is operated by a two position air cylinder 7. When the gate is in the upper position shown in this FIG., the top of the gate seats against the opening in the partition 39. Product flows rapidly (bulk flow) from the lower section 41 of the supply unit into the weigh bucket and after the lower section has been emptied, flow of the product is slowed to a dribble feed from the upper section 41 of the supply unit through the bulk and dribble gate. When a predetermined weight has been discharged into the weigh bucket a signal from the sensing element causes the air cylinder to lower the bulk and dribble gate. In the lower position the outside wall of the bulk and dribble gate seats against the wall of the supply unit and the inner portion of the bulk and dribble gate is sealed by seating against the gate rest on the weigh bucket.

Figure 7:
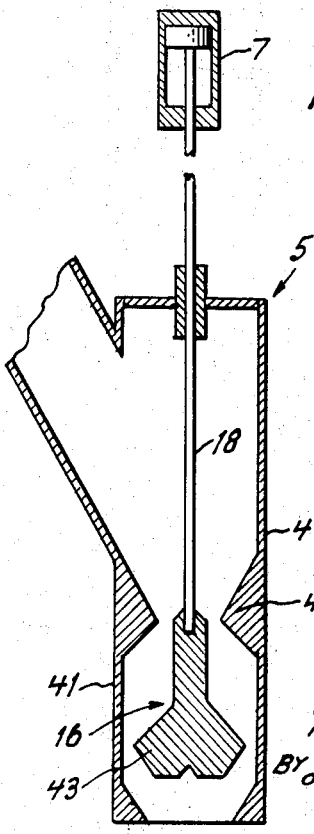
FIG. 7 is a longitudinal cross section of a product supply unit showing another alternative construction for the control of the bulk and dribble flow of product.

FIG. 7 is a longitudinal cross section of a product supply unit 5 showing another alternative for control of bulk and dribble flow. The supply unit 5 is partitioned into upper 4 and lower 41 sections by a partition 42 affixed to the wall of the supply unit, the partition having a restricted, circular opening concentric to the walls of the supply unit. The bulk and dribble gate 16 is shaped like a segment of a cone 43 with a cylinder 44 rising from the narrow portion of the cone segment and forming the remainder of the bulk and dribble gate. In the raised position shown in this FIG., product rapidly (bulk) flows out of the lower section 40 of the supply unit and then flows slowly (dribbles) from the upper section 41 of the supply unit through the channel formed by the bulk and dribble gate and the partition. In a lowered position the bottom of the bulk and dribble gate seats against the bottom of the supply unit and prevents any further flow out of the supply unit. The bulk and dribble gate is connected to a two position air cylinder 7 by a connecting rod 18.

The utility and benefits to be derived from the apparatus of this invention are illustrated by the following example.

EXAMPLE

A product supply unit and weigh bucket as shown in FIG. 2 were constructed and mounted in a fixed position. 8 oz. jars of soluble coffee were filled using the apparatus and a total of 3 batches of coffee, 200 to 500 lbs. per bath, were run through the apparatus. The product from every jar was weighed and the net weight variation expressed as a 3 sigma variation was 0.051 oz., 0.066 oz. and 0.054 oz. for the 3 batches. The small variation in net weight is excellent and is to be compared to a 3 sigma variation of 0.360 when using volumetric filling machines, commonly used in the soluble coffee industry.

The above description of the apparatus and examples have been given to illustrate the usefulness of this invention, it being apparent that variations of the apparatus not described in detail are within the scope of this invention. The invention is to be considered limited only by the scope of the following claims.

We claim:

1. An apparatus for dispensing a measured quantity of particulate matter comprising a weigh bucket, a weigh cell and a plunger valve; said weigh bucket being mounted in a vertical position, the upper portion of said bucket forming an opening for receiving particulate matter, the bottom section of said bucket being open for discharging said matter; the plunger valve mounted at the bottom of said bucket, said plunger valve seating against the bottom of said bucket to cover the bottom opening of the bucket; the weight of particulate matter received in the bucket being detected by the weigh cell, a signal from the weigh cell causing the feed to the bucket to stop when a predetermined weight has been received into the bucket, said bucket and plunger valve moving downward together when particulate matter is received by the bucket;

the bottom of said bucket seating against the upper edge of a transfer head when the predetermined quantity of particulate matter has been received; said plunger valve moving vertically and independently of said bucket thus uncovering the bottom opening of the bucket allowing the particulate matter to flow out of said bucket through the transfer head and into a container positioned below the transfer head; said bucket and plunger valve returning to a starting position when the bucket is empty.

2. The apparatus of claim 1 wherein said plunger valve is mounted at the bottom of said weigh bucket by a vertically extending rod, the bottom of said rod being affixed to said plunger valve, the rod extending through the top opening formed by said weigh bucket, the upper end of said rod being affixed to means for positioning said plunger valve against the bottom of said weigh bucket, said means permitting the moving together of said weigh bucket and plunger valve downward and said means moving said plunger valve vertically independently of the weigh bucket to allow the particulate matter to flow out of said weigh bucket.

3. The apparatus of claim 2 wherein said means for positioning said plunger valve is a two position air cylinder.

4. The apparatus of claim 2 wherein said transfer head is a hollow cylindrical block; the weigh bucket in a lowered position seating against the upper surface of said block; the container seated against the lower surface of said block such that when the plunger valve is moved away from the bottom opening of the bucket the particulate matter will flow from the bucket through the transfer head and into the container; a vacuum line in the lower portion of said block, said vacuum line connecting the hollow portion of said block and a vacuum source; a gas line in the lower portion of said block, said gas line connecting the hollow portion of said block and gas source, means for controlling a sequence of steps after the weigh bucket has seated against the transfer head such that a vacuum is pulled in the transfer head and container, the plunger valve is moved away from the bottom opening of the bucket, the particulate matter flows from the bucket into the container, the vacuum is broken by a flow of gas into the transfer head, and the weigh bucket and plunger valve rise to their starting position.

5. The apparatus of claim 4 wherein said means for positioning said plunger valve is a two position air cylinder.

6. The apparatus of claim 4 wherein said plunger valve is mounted at the bottom of said bucket by a tension spring extending vertically above said plunger valve within said weigh bucket, the lower portion of said spring being affixed to the plunger valve and the upper portion of said spring being affixed to support bar; said support bar being mounted horizontally across the top of the weigh bucket and affixed to the weigh bucket; the force exerted on said plunger valve by the pressure differential above and below the plunger valve when the vacuum is pulled on the transfer head and the container overcoming the tension of said tension spring and said plunger valve moving vertically down within the hollow of said head; the particulate matter flowing into said receptacle; the tension spring seating said plunger valve against the bottom of said bucket when the vacuum is broken by a flow of gas into the transfer head, said weigh bucket and plunger valve rising together to a starting position.

7. The apparatus of claim 1 wherein the flow of particulate matter into said bucket is controlled by a supply unit and a bulk and dribble gate; the supply unit being mounted above the bucket, said supply unit being a hollow chamber, the axis of said chamber extending vertically, said chamber forming an opening near the top permitting flow of particulate matter into the chamber, said chamber forming an opening at the bottom permitting flow of particulate matter out of the chamber; said bulk and dribble gate mounted concentrically within the chamber, said gate moving vertically within the chamber; the gate stopping the flow of particulate matter out of the chamber in a lowered position; said gate in a raised position and the walls of said chamber forming channels restricting the flow of particulate matter from bulk flow to dribble flow; and means for moving said gate.

8. The apparatus of claim 2 wherein the flow of particulate matter into said bucket is controlled by a supply unit and bulk and dribble gate; the supply unit being mounted above said bucket, said supply unit being a hollow chamber, the axis of said chamber extending vertically, said chamber forming an opening near the top permitting flow of particulate matter into the chamber, said chamber forming an opening at the bottom permitting flow of particulate matter out of the chamber; said bulk and dribble gate mounted concentrically within the chamber, said gate moving vertically within the chamber; the gate stopping the flow of particulate matter out of the chamber in a lowered position; said gate in a raised position and the walls of said chamber forming channels restricting the flow of particulate matter from bulk flow to dribble flow; and means for moving said gate.

9. The apparatus of claim 8 wherein said means for positioning said plunger valve and said bulk and dribble gate is a two position air cylinder.

10. The apparatus of claim 9 wherein said bulk and dribble gate is conical and mounted vertically within said chamber, the circular base of said gate being concentric with the walls of said chamber, the apex of said gate being the upper portion of the gate; the gate in a lowered position seating against the bottom of said chamber covering the opening formed by the bottom of said chamber, said chamber being filled with particulate matter flowing through an opening formed by the wall of said chamber near the top of the chamber; said gate in a fully raised position forming a channel with the walls of the chamber, particulate matter flowing rapidly out of said chamber, said gate in an intermediate position forming a restricted channel with the bottom of said chamber, particulate matter dribbling through said channel; and means of moving said gate.

11. The apparatus of claim 10 wherein said means for moving said gate is a vertically extending rod, the lower end of said rod being affixed to the upper end of said gate, said rod extending through the top of said chamber, the upper end of said rod being affixed to means for positioning said gate.

12. The apparatus of claim 11 wherein said means for positioning said gate is a three position air cylinder.

13. The apparatus of claim 6 wherein the flow of particulate matter into said bucket is controlled by a supply unit and a bulk and dribble gate; the supply unit being mounted above said bucket, said supply unit being a hollow chamber, the axis of said chamber extending vertically, said chamber forming an opening near the top permitting flow of particulate matter into the chamber, said chamber forming an opening at the bottom permitting flow of particulate matter out of the chamber; said bulk and dribble gate mounted concentrically within the chamber, said gate moving vertically within the chamber; the gate stopping the flow of particulate matter out of the chamber in a lowered position; said gate in a raised position and the walls of said chamber forming channels restricting the flow of particulate matter from bulk flow to dribble flow; and means for moving said gate.